United States Patent
Bliss et al.

(10) Patent No.: US 6,771,442 B2
(45) Date of Patent: Aug. 3, 2004

(54) OFF-TRACK INTERFERENCE EMULATOR

(75) Inventors: William G. Bliss, Thornton, CO (US); James W. Rae, Rochester, MN (US)

(73) Assignee: Infineon Technologies AG, Munich (DE)

( * ) Notice: Subject to any disclaimer, the term of this patent is extended or adjusted under 35 U.S.C. 154(b) by 295 days.

(21) Appl. No.: 09/896,885

(22) Filed: Jun. 29, 2001

(65) Prior Publication Data

US 2003/0011917 A1 Jan. 16, 2003

(51) Int. Cl.[7] .................................................. G11B 5/09
(52) U.S. Cl. .......................................... 360/39; 360/55
(58) Field of Search ............................. 360/65, 46, 85, 360/51, 39, 55; 369/59.19

(56) References Cited

U.S. PATENT DOCUMENTS

| | | | |
|---|---|---|---|
| 4,847,871 A | | 7/1989 | Matsushita et al. |
| 5,157,672 A | | 10/1992 | Kondou et al. |
| 5,343,335 A | * | 8/1994 | Hara .......................... 360/45 |
| 5,490,091 A | | 2/1996 | Kogan et al. |
| 5,535,220 A | | 7/1996 | Kanno et al. |
| 5,537,443 A | | 7/1996 | Yoshino et al. |
| 5,588,011 A | | 12/1996 | Riggle |
| 5,734,680 A | | 3/1998 | Moore et al. |
| 5,784,415 A | * | 7/1998 | Chevillat et al. ............. 360/65 |
| 5,786,951 A | * | 7/1998 | Welland et al. ............... 360/46 |
| 5,808,994 A | * | 9/1998 | Tanaka et al. ........... 369/59.19 |
| 5,822,143 A | | 10/1998 | Cloke et al. |
| 5,892,632 A | * | 4/1999 | Behrens et al. ............... 360/51 |
| 5,987,634 A | | 11/1999 | Behrens et al. |
| 5,991,341 A | | 11/1999 | Shin |
| 5,995,305 A | | 11/1999 | McNeil et al. |
| 6,163,517 A | | 12/2000 | Kim et al. |
| 6,201,840 B1 | | 3/2001 | Rub et al. |
| 6,449,110 B1 | * | 9/2002 | DeGroat et al. .............. 360/46 |

FOREIGN PATENT DOCUMENTS

| | | |
|---|---|---|
| EP | 0 426 353 A2 | 5/1991 |
| EP | 0 426 353 A3 | 11/1991 |
| EP | 0 426 353 B1 | 7/1995 |
| EP | 0 964 533 A2 | 12/1999 |
| EP | 1 081 867 A2 | 3/2001 |
| EP | 1 081 868 A2 | 3/2001 |
| WO | WO 01/80238 A1 | 10/2001 |

OTHER PUBLICATIONS

Palmer, Dean, et al., "Overwrite in Thin Media Measured by the Method of Pseudorandum Sequences," *IEEE Transactions on Magnets*, vol. 24, No. 6, Nov. 1988, pp. 3096–3098.
Ziperovich, Pablo A., et al., "CMOS Implementation of a Viterbi Detector for Hard Disk Drives," Custom Integrated Cirucits Conference, 1993, Proceedings of the IEEE 1993, San Diego, California, May 9–12, 1993, pp. 1031–1034.
International Search Report, dated Dec. 11, 2002, for corresponding international application No. PCT/US02/19090.
Koeter, John, "What's an LFSR?" *Texas Instruments Incorporated*, SCTA036A, Dec. 1996.

* cited by examiner

*Primary Examiner*—David Hudspeth
*Assistant Examiner*—Rocio Colon
(74) *Attorney, Agent, or Firm*—Brinks Hofer Gilson & Lione

(57) ABSTRACT

An apparatus and method for adding errors to magnetic data and then detecting the errors is revealed. The method includes providing a magnetic recording channel, reading and digitizing a stored signal, introducing an error signal that emulates off-track interference, adding the error to the digitized signal, and determining an error rate. The apparatus includes a magnetic recording channel having a linear feedback shift register to generate a pseudo-random binary sequence, circuitry to convert the sequence into an error signal, and a Viterbi detector to quantify an error rate.

23 Claims, 4 Drawing Sheets

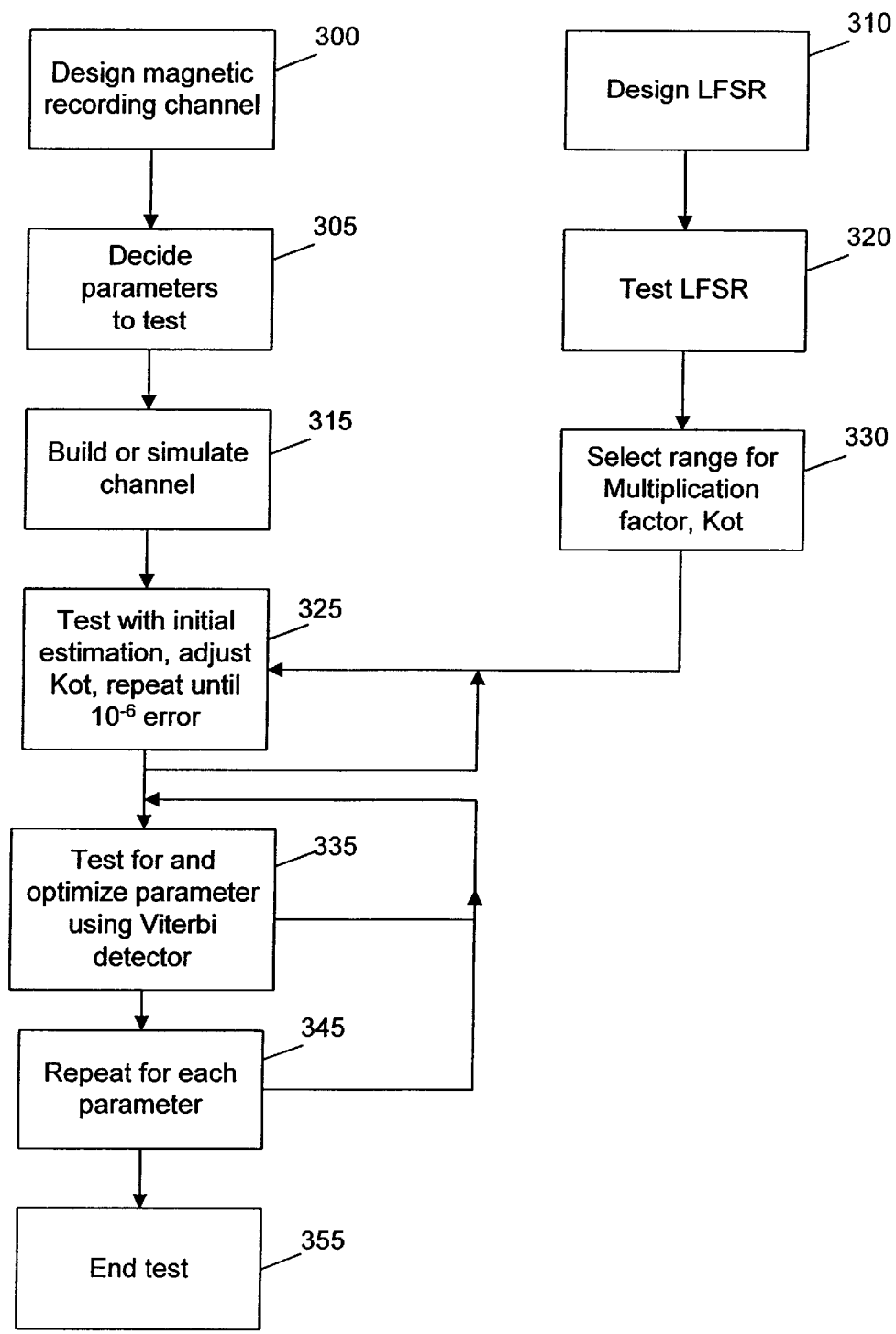

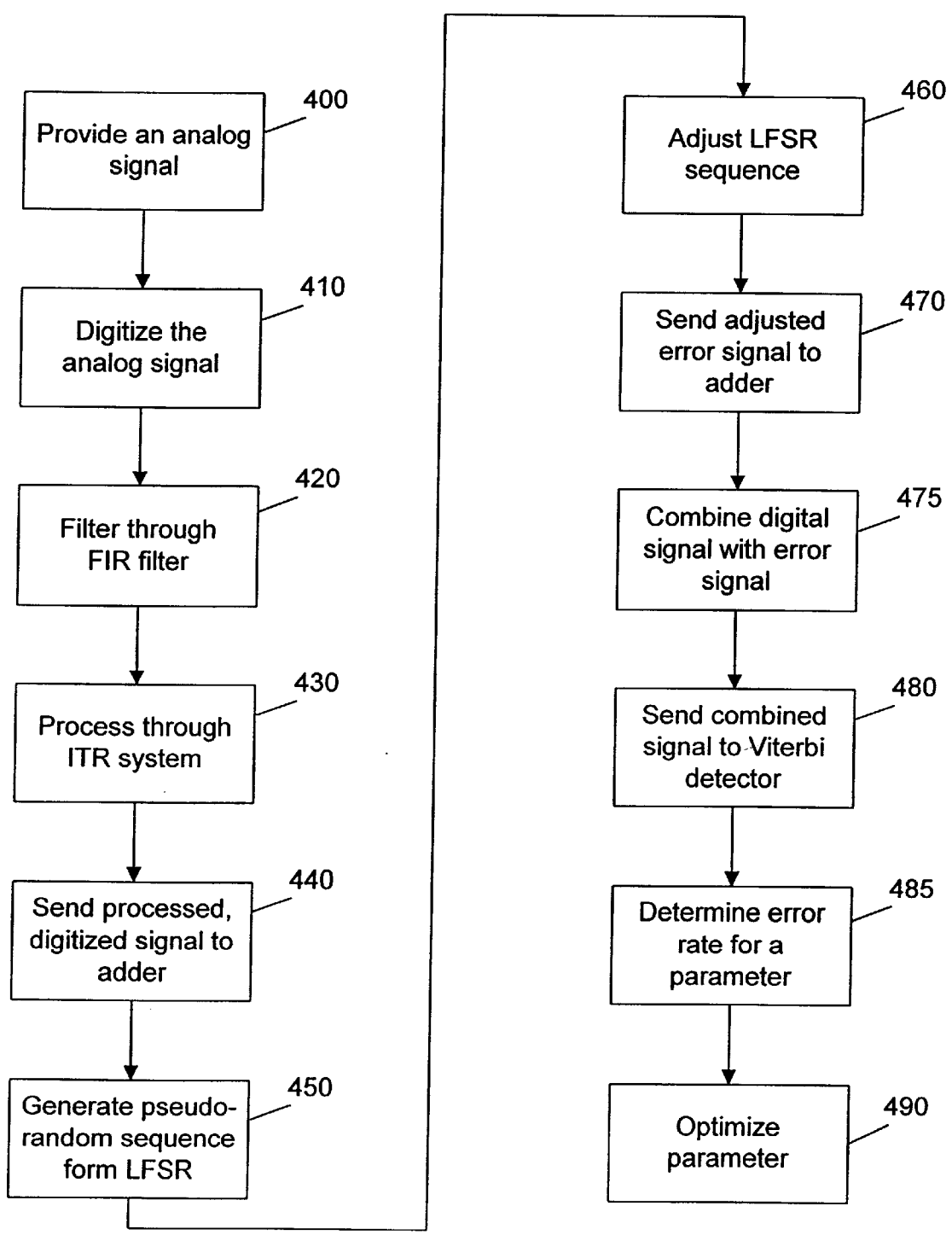

OFF-TRACK INTERFERENCE EMULATOR

FIELD OF THE INVENTION

The invention pertains to the field of computer storage and retrieval systems and in particular to a method for adjusting the operating parameters of disk drives by determining the errors in reading and writing signals to the disk drive and then optimizing the parameters for the drive.

BACKGROUND

A data storage and retrieval system, such as a hard disk drive or a floppy disk drive, is typically the principal memory device in a desktop computer. The technology of memories and disk drives has improved from the days when a single megabyte was considered abundant memory, to the present day in which a hard disk capable of storing many gigabytes is considered standard. In some disk drives, the read/write tracks now approach 100,000 tracks per inch (about 40,000 tracks per cm). Put another way, each track is separated from the next by about 10 millionths of an inch (about 25 millionths of a cm).

One thing that has not changed is the need for this device to store data accurately, and for the disk drive read/write head to "read" each byte correctly and to store or "write" each byte correctly. Disk drives must be manufactured and tested to ensure that error rates are within the acceptable range of about 1 in 100 million or less. In order to accurately test for such low error rates, it may take a very long time, up to several minutes, in order to "read" or "write" up to $10^{10}$ bits and determine an error rate with a sample of at least about 100 errors. This process must be repeated for each parameter tested, and a typical disk drive may have hundreds of parameters that must be optimized and tested.

In order to speed up the process, additive white Gaussian noise (AWGN) may be added to a signal in the readback signal path. This adds errors to the signal and allows faster determination of error rates in the disk drive. However, AWGN is not typical of the interference normally encountered in disk drive service. Therefore, disk drives that are optimized by using AWGN for their channel settings may not have the ideal settings for a "real-world" low error rate. What is needed is a way to speed up the testing and optimization of disk drives by adding an error more realistic and typical of hard disk drive service.

BRIEF SUMMARY

In order to address these deficiencies of the prior art, a disk drive having a magnetic recording channel is tested by adding an interfering signal simulating an error of an adjacent track of the disk drive. In one embodiment, method for testing the magnetic recording channel for a disk drive comprises providing the magnetic recording channel, providing a first signal from the disk drive, and digitizing the signal to a digital output. The method also includes providing a pseudo-random interference signal. The pseudo-random interference signal emulates an error signal produced by the read/write head reading data from an adjacent track rather than from the desired track on the hard disk drive. The interference signal is added to the digital output to provide a second signal. The second signal, including the interference, is sent to a Viterbi detector to determine an error rate.

In another embodiment, a magnetic channel off-track interference emulator for generating a pseudo-random interference signal is discussed. The emulator comprises an analog to digital converter (ADC) that receives an analog signal from a read/write head and converts the signal to a digitized output. The emulator also comprises a linear feedback shift register (LFSR) that generates a pseudo-random binary sequence of numbers, the sequence simulating a signal close to that of an error signal from off-track random data. The emulator also includes a multiplier, the multiplier receiving an output from the LFSR and applying an adjusting factor to form an interference signal. The interference signal and the digitized output of the ADC are sent to an adder to produce a test signal. The emulator also includes a Viterbi detector that detects errors in the test signal and determines an error rate.

Further aspects of the invention will be apparent from the drawings and description of the preferred embodiments detailed below.

BRIEF DESCRIPTION OF SEVERAL VIEWS OF THE DRAWINGS

FIG. 3 is a flow chart for a process of optimizing disk drive parameters using an off-track interference emulator.

FIG. 4 is another flow chart for a process of using an off-track interference emulator to optimize disk drive parameters.

DETAILED DESCRIPTION OF THE PRESENTLY PREFERRED EMBODIMENTS

A disk drive typically includes at least one disk mounted for very fast rotation on a spindle or hub. The disk drive also includes a read/write head or transducer supported on an air bearing that flies above each disk, and a magnetic recording channel, electronic hardware that encodes and decodes the data for read/write operations. A drive controller may be used to control the disk drive based on commands from a system controller. The system controller commands the disk drive to retrieve information (read) from the disks and to store information (write) on the disks. A hard disk drive having a read/write head and at least one disk is also known as a head disk assembly. Typically, a very accurate electromechanical actuator moves the data head radially over the disk surface to seek a track and holds the read/write head directly over a track on the disk surface for track following operations. The magnetic recording channel may be implemented as discrete circuitry or hardware, or in a drive controller of the disk drive. Floppy disk drives may also use used in storage and retrieval systems.

Figure 1:
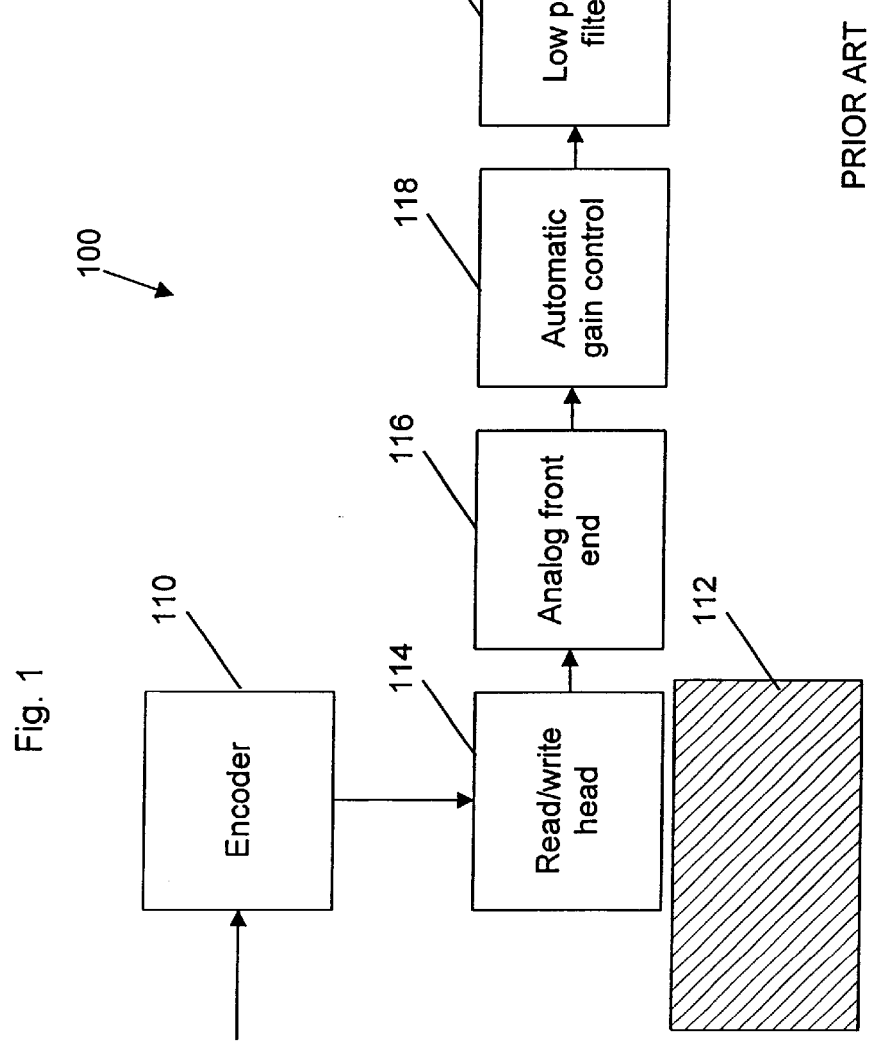
FIG. 1 is a simplified block diagram for prior art Viterbi processing.

Information is stored in concentric tracks on the surface of the disks by supplying a write signal to the read/write head to write data to the disk, representing information to be stored. To retrieve data from the disk, the system controller controls the actuator so that the head flies above the disk, sensing the information on the disk, and generating a read signal from the stored information. The read signal is then conditioned and decoded to recover the data. FIG. 1 is a block diagram of a portion of a standard data storage and retrieval system 100. The system 100 includes an encoder 110, disk 112, read/write head 114, analog front end (AFE) conditioning circuitry 116, automatic gain control 118, a low-pass filter 120, a finite impulse response (FIR) filter 122, and a Viterbi detector 124. Magnetic recording channels typically include analog front end conditioning circuitry 116, an automatic gain control 118, at least one filter 120, 122, and a Viterbi detector 124.

A drive controller (not shown) receives a command from a system to read data from, or write data to, a certain portion of disk 112. In response to the command signal, the drive controller positions the read/write head 114 over the desired track. If data is to be written, the data is provided by the drive controller to the encoder 110 that encodes the data. The code may contain constraints, such as a maximum transition run (MTR, the maximum number of consecutive transitions between 0 and 1). These constraints may also vary over time. The encoded data is then provided in the form of a write signal to the read/write head 114. The read/write head 114 then writes the data by means of flux reversals on the surface of the disk 112, which reversals are indicative of data to be encoded.

If a read operation is to be performed, the read/write head 114 then develops a read signal indicative of flux reversals on the track over which the read/write head 114 is positioned. The read signal is provided to analog front end conditioning circuitry 116, which may include an analog-to-digital converter, and automatic gain control 118. The signal is processed by a low-pass filter 120, the FIR filter 122, and the Viterbi detector 124. The Viterbi detector detects errors by determining the most likely sequence of bits of the data so processed using a Viterbi algorithm for partial response maximum likelihood (PRML). The signal may then be sent to a decoder for further processing.

Viterbi detectors are used for high-speed, reliable PRML decoding in partial response systems. Magnetic read tracks are inherently partial response in their nature, due to the ternary nature of the codes (0, ±1) used for signal transmission. In a magnetic recoding device, such as a disk drive, data is recorded by changing the direction of the magnetic field of the particles on the medium. During a read operation, a read/write head passes over the particles and the medium, producing an analog output voltage corresponding to detected changes in flux caused by transitions in magnetic field direction. The signal detected by the read head is typically non-return-to-zero (NRZ) data, in which no change in the direction of the magnetic field from bit to bit results in an output voltage of 0, and a change in the magnetic field direction results in an output voltage of ±1, the voltage opposite from the previous transition. Partial response (PR) channels are characterized by polynomials of the form $P(D)=(1-D)$, where D is a delay operator corresponding to a z transform of a discrete-time impulse response $z^{-1}$ corresponding to a one-bit time delay. Viterbi detectors typically use a PR response characterized by $P(D)=(1-D^2)$, or an extended PR4 response characterized by $P(D)=(1+D)^n(1-D)$, where n=2, 3, . . . Other partial response formats or systems may also be used.

Maximum likelihood detectors operate by receiving a sampled signal and selecting a known signal closest in similarity to the received sample for output. A Viterbi algorithm is a very effective maximum-likelihood sequence estimator that eliminates the need to store all known incoming signals for comparison and subsequent reproduction. Instead, the Viterbi algorithm operates on the principal that the likelihood of being in a particular state at time k is only a function of the likelihoods for the states at time k−1 and the branch metrics from time k−1 to time k. Viterbi algorithms may be designed into hardware of the magnetic channel.

Figure 2:
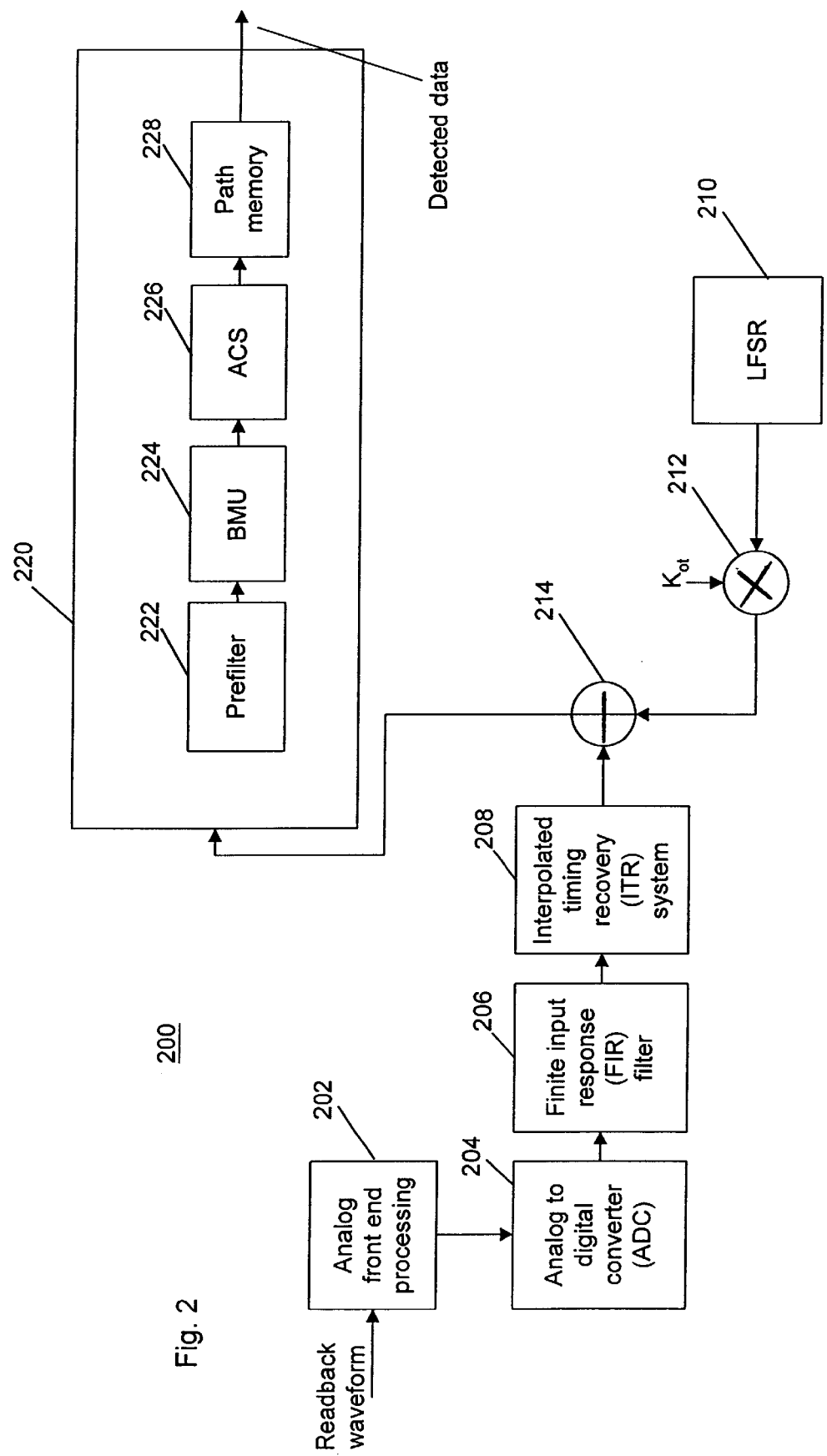
FIG. 2 is a simplified block diagram of a magnetic recording channel utilizing an off-track interference emulator.

The block diagram 200 of FIG. 2 is a preferred embodiment of unit operations and hardware to emulate off-track interference and determine error rates for a magnetic recording channel. The magnetic recording channel is meant for read/write decoding using an off-track interference simulator. Preferably, the hardware resides on a chip, such as an integrated circuit or an application specific integrated circuit (ASIC) in a hard disk drive.

The readback waveform from the read/write head is processed through analog front end (AFE) processing 202 to amplify the signals to a target amplitude and to eliminate the high-frequency noise. The signals are then input to an analog to digital converter (ADC) 204. The signal is digitized so that the output of the ADC is a time sequence of ternary numbers (0, ±1), representing amplitude samples over time (and distance) of the applied input analog voltage. The ternary output may be scaled to a desired number of bits. The signal is further processed by a finite impulse response (FIR) digital filter 206 and sequentially with an interpolated timing recovery (ITR) system 208. The FIR digital filter 206 equalizes the frequency components of the signal so that the output of the FIR is normalized to unit amplitudes. The signal is digitized so that the output of the ITR is a time sequence of ternary numbers (0, ±1), representing amplitude samples over time (and distance) of the applied input analog voltage. The ternary output may be scaled to a desired number of bits. This response defines a partial response class 4 (PR4) system. Other systems may be used.

The ITR system 208 adjusts the time rate of the input stream from the FIR filter 206 and the output stream from the ITR system 208. This system, in combination with other signal processing, such as a phase-locked loop (not shown), adjusts the time samples generated by the ITR so that they are synchronous with the bit-rate of the readback signal. In one embodiment, the ADC oversamples and the input clock rate to the ITR is 6.66% higher than the output rate. Other clock rates may be used, such as 5%. The rate difference is accommodated by using a skip clock, in which some of the clock cycles are periodically discarded, so that the effective clock rate is the same as the bit rate. The function of the ITR is thus to time-normalize the digital amplitude waveform samples.

Once the samples have been normalized with respect to pulse response, amplitude and time, they are suitable as inputs to a Viterbi detector 220. The operation of the Viterbi detector depends on the input signals having a given amplitude, a given sample-time (sequence) and a given impulse response for the input waveforms. While there are many Viterbi detectors, one embodiment uses a Viterbi detector that includes a prefilter 222, a branch metric unit 224, an add-compare-select unit 226, and a path memory unit 228. The Viterbi detector then performs its function: given the sampled and conditioned input waveforms, the detector determines the most-probable pattern originally written.

An interfering signal that adds a realistic error to the read/write waveforms may be generated from a linear feedback shift register (LFSR) 210. A shift register may be simply a chain of flip-flops in which the output of the nth flip-flop is tied to the input of the $(n+1)^{th}$ flip flop. An LFSR may also be implemented through software. Every time a clock of the system pulses, the input to the flip-flop is clocked through to the output, and thus the data retained in the flip-flops are shifted over one stage. Linear feedback shift registers are known to produce pseudo-random pattern generators. A user may select the number of patterns so generated, or the pattern count, $2^{n-1}$, by selecting n, the number of register elements or bits in the LFSR. A three-bit LFSR will produce 7 possible patterns. On the other end, a 32-bit LFSR may produce over 4 billion patterns. At a clock-rate of 100 MHz, it will take almost a minute to generate the entire pattern set for a 32-bit LFSR. It has been found that 3-bit to 15-bit LFSRs provide a good test sequence at a fast rate, from 10 sec. to 30 sec. per parameter tested. There is no limit as to how many bits may be used. 32 bits or more may be used if the importance of the parameter to be optimized justifies the longer test time. A preferred embodiment uses 7 bits, generating 127 different patterns.

The operation of the LFSR emulates adjacent track interference in the operation of the read/write head 114, termed "off-track interference." The LFSR 210 generates a pseudo-random binary sequence (PRBS) that is close to the type of signal from an adjacent track written with random data. The time-varying sequence of output voltages from the LFSR is then adjusted 212 by a adjusting factor $K_{ot}$. In one embodiment, the adjusting factor $K_{ot}$ is adjusted to yield an error of from about one bit per million bits read to about one bit per 10 million bits. In other embodiments, the adjusting factor is adjusted to yield an error of from about one bit per million bits to about one bit per 100 million bits. In one embodiment the adjusting factor may be a number of least significant bits (LSBs) and must be less than the number used to scale and digitize the analog signal. The error signal so produced is added by adder 214 to the conditioned readback signal provided by ITR system 208. The adjusting factor is preferably programmable from a user interface (not shown) so that it may be conveniently adjusted during optimization.

These error rates then become sensitive indicators of the effects of channel or track parameters. These parameters are adjusted before manufacturing of disk drives that include a magnetic recording channel. There may be hundreds of such parameters, including precompensation settings, head current, magnetoresistive asymmetry compensation, and so on. In one embodiment, a manufacturer will vary a parameter over a range to determine a minimum error rate. Because the error rates are large enough to be determined quickly, each parameter may be adjusted quickly. The user will have confidence in adjusting the parameters, because the interfering signal added by the LFSR and the adjusting factor matches realistic errors or interfering signals under conditions of actual use. Therefore, the parameters adjusted according to this process are close to optimal for read/write operations for a magnetic recording channel.

FIG. 3 is a flow chart of one embodiment of a process that uses an off-track interference emulator, as described in FIG. 2. A user designs a magnetic recording channel 300 and as part of the design process, determines which parameters of channel performance are important and which parameters should be optimized and tested 305. The user may also design or appropriate a linear feedback shift register (LFSR) 310. The user may test the register 320 or otherwise insure that the output of the register and the number of bits selected is compatible with the time and cost constraints of the design process. A range of adjustment factors $K_{ot}$ may also be selected or designed 330.

The user proceeds to build a test channel or to construct a computer model of the channel 315. Whether dealing with a physical drive or a model, initial tests are typically run to tune the channel 325 such that its operating parameters are capable of no more than about 1 bit error per million bits read by the read/write head from a disk. During this portion of the process, $K_{ot}$ is selected and is preferably not altered during the process for each parameter.

After the initial tuning, a user lists parameters requiring fine-tuning, adjustment, or optimization. Optimization then proceeds 335, with each parameter receiving an initial test result, and if necessary, repeating the process as depicted in FIG. 3 after tuning or adjusting the parameter. After one parameter for the channel has been optimized, the process may be repeated for each parameter requiring optimization 345. After all parameters have been satisfactorily optimized, the optimization process is complete and testing is ended 355.

FIG. 4 discloses another embodiment of a method of testing for magnetic channel off-track interference. In this embodiment, a user provides an analog output signal 400 from a read/write head of a disk drive. An ADC converts the analog signal to a digital output 410. The digital output is then filtered through a finite input response (FIR) filter 420, and through an interpolated timing recovery (ITR) system 430. The signal so processed is sent to an adder 440. At the same time, a pseudo-random binary sequence (PRBS) similar to an off-track error signal is generated from a linear feedback shift register (LFSR) 450. The sequence is then adjusted by an adjustment factor 460, so that the end result of the test sequence is a channel error rate of between about 1 bit error rate per 1 million bits read to about 1 bit per 10 million bits read. The factor is adjusted 470 if necessary to achieve this error rate. The error signal sequence is then combined at the adder with the digitized signal sequence 475, and the combined signal is sent to a Viterbi detector 480. The Viterbi detector then determines an error rate for a particular value of a particular parameter used in manufacturing disk drives 485. The parameter is then adjusted as desired so as to minimize the error rate on a subsequent setting of the parameter, optimizing the parameter 490.

In one embodiment, the output of a read/write head, or the simulated analog signals from a read/write head, are processed. In Table 1, a time sequence of analog signals is read by a read/write head and processed by an ADC. The ADC reads the analog signal, scales the signal to some number of least significant bits (LSBs), and sends a digitized output to an ITR system. The sampling rate of the ADC may be faster than the output of the ITR. In one example, the ADC samples every 0.9 time period, while the ITR samples every 1.0 time periods. Thus, the ADC output changes every 0.9 time periods, but the ITR samples only every 1.0 time periods. In this embodiment, the simulation uses pre-equalized signals, and an FIR filter is not needed. In other embodiments, an FIR filter may be useful. The ITR output now consists of a time-sequence of digital outputs, −1, 0, 1, whose magnitude is related to the inputs to the ADC. This output may be scaled to a desired number of LSBs, such as 24. The output of the ITR system is thus a series of digital outputs, scaled to −24 LSBs, 0 LSBs or 24 LSBs. This is a partial response sampling system, and thus not every analog signal will be sampled. In this example, one sample in ten is selected for sampling to the ITR system. The ITR system functions to interpolate the output of the over-sampling ADC. Thus, only one sample in ten is selected for off track interference and Viterbi sampling.

TABLE 1

| Time | ADC Input, mV | ADC Output, LSB | ITR output, LSB |
|---|---|---|---|
| 0 | 0.000000 | 0 | 0 |
| .1 | 0.038771 | | |
| .2 | 0.092391 | | |
| .3 | 0.161941 | | |
| .4 | −0.247753 | | |

TABLE 1-continued

| Time | ADC Input, mV | ADC Output, LSB | ITR output, LSB |
|---|---|---|---|
| .5 | −0.349251 | | |
| .6 | 0.464841 | | |
| .7 | 0.591903 | | |
| .8 | 0.726701 | | |
| .9 | 0.864566 | 21 | |
| 1.0 | 1.000 | | 24 |

A linear feedback shift register is now used to generate a pseudo-random binary sequence (PRBS), as shown in Table 2. Note the changed time scale in Table 2. In this embodiment, a 7-bit long LFSR is used to produce a repeating PRBS that is 127 bits long. A seed value of "1111111" is used and the first value in the registers is "1111111." This will allow startup without a troublesome "0000000" startup possibility. The sequence may be offset by a value of 0.5, and then scaled to a selected number of LSB units. Thus, a random sequence of 127 numbers (PRBS) that begins "1111000010", will first be offset to "0.5, 0.5, 0.5, 0.5, −0.5, −0.5, −0.5, −0.5, 0.5, −0.5." In this embodiment, a "1" thus becomes a positive interference value and a "0" becomes a negative interference value. This value is then scaled to a desired number of LSBs. The number of LSBs desired will depend on the error rate achieved in the Viterbi detector. In one embodiment, the number of LSBs selected is 3. The random sequence that is added to the output of the ITR thus becomes "+3 LSBs, +3 LSBs, +3 LSBs, +3 LSBs, −3 LSBs, −3 LSBs, −3 LSBs, −3 LSBs, +3 LSBs, −3 LSBs." In one embodiment, this signal was routed to a Viterbi detector and an error rate of $10^{-6}$, one bit error per million bits, was detected. If the chosen value yields too few errors, more LSBs may be used, perhaps 4 LSBs. If the chosen value yields too many errors, the scaling or adjusting may be lessened, to perhaps 2 LSBs. In other embodiments, a different number of LSBs may be Table 3 below indicates one method of selecting Kot by relating the PSBR sequence of 0's and 1's to LSBs added as an interference factor.

TABLE 2

| Time | ITR Output, LSB | OT Interference (from PRBS), bits | Input to Viterbi, bits |
|---|---|---|---|
| 0 | 0 | 0 | 0 |
| 1 | 24 | +3 | 27 |
| 2 | 24 | +3 | 27 |
| 3 | −24 | +3 | −21 |
| 4 | 0 | +3 | +3 |
| 5 | 0 | −3 | −3 |
| 6 | 0 | −3 | −3 |
| 7 | 24 | −3 | 21 |
| 8 | 0 | −3 | −3 |
| 9 | 0 | +3 | +3 |
| 10 | −24 | −3 | −27 |

In one example, a 0 from a PSBR may be considered an inverting digit and a 1 a non-inverting digit. If the string of random numbers from the 7-bit LFSR above is continued for ten more numbers, it may yield 1011110010. If a user selects Kot as 4, this sequence is then converted to +4 LSB, −4 LSB, +4 LSB, +4 LSB, +4 LSB, +4 LSB, −4 LSB, −4 LSB, +4 LSB, and −4 LSB. This sequence is added to the digitized output of the ITR and the result is then sent to the Viterbi.

TABLE 3

| Kot selected | Inverting correction Factor "0" | Noninverting correction Factor "1" |
|---|---|---|
| 0 | 0 LSB | 0 LSB |
| 1 | −1 LSB | +1 LSB |
| 2 | −2 LSB | +2 LSB |
| 3 | −3 LSB | +3 LSB |
| 4 | −4 LSB | +4 LSB |
| 5 | −5 LSB | +5 LSB |

Although only a few embodiments of the invention have been discussed, other embodiments are contemplated. Many other variations to this signal may also be used, such as a further multiplication or addition factor. As depicted in the example, the analog signal may be scaled or normalized as part of the process. The correction factor for the pseudo-random sequence has been characterized as a multiplier. Other embodiments may use the addition or subtraction of a number in addition to a multiplication to achieve the same result. It is therefore intended that the foregoing description illustrates rather than limits this invention, and that it is the following claims, including all equivalents, which define this invention. Of course, it should be understood that a wide range of changes and modifications may be made to the embodiments described above. Accordingly, it is the intention of the applicants to protect all variations and modifications within the valid scope of the present invention.

What is claimed is:

1. A method of testing a magnetic recording channel for a data storage and retrieval system, the method comprising:
   providing a magnetic recording channel;
   providing a first signal to the channel from the data storage and retrieval system;
   converting the first signal to a digital output;
   providing a pseudo-random interference signal to the channel;
   adding the interference signal to the digital output to produce a second signal;
   sending the second signal to a Viterbi detector; and
   determining an error rate for the channel.

2. The method of claim 1, wherein the pseudo-random interference is produced using a linear feedback shift register.

3. The method of claim 2, further comprising adjusting an output of the linear feedback shift register by an adjusting factor to produce an adjusted interference signal.

4. The method of claim 2, wherein the data storage and retrieval system is selected from the group consisting of a hard disk drive and a floppy disk drive.

5. The method of claim 1, wherein the channel is selected from the group consisting of a physical channel and a computer model of a channel.

6. The method of claim 3, further comprising changing the adjusting factor after determining the error rate, providing another first signal from the data storage and retrieval system, providing a pseudo-random interference signal, multiplying the pseudo-random interference signal by a changed adjusting factor to produce an adjusted interference signal, adding the adjusted interference signal to the first signal to produce an adjusted digital output, sending the adjusted digital output to a Viterbi detector, and again determining a second error rate.

7. The method of claim 1, wherein the digital output is processed by a finite impulse response filter and an interpolated timing recovery system.

8. The method of claim 7, wherein the interpolating timing recovery system operates at a speed at least 5% faster than a bit rate of the first signal.

9. The method of claim 1, wherein the error rate is from about 1 bit in 1 million bits read to about 1 bit in 100 million bits read.

10. The method of claim 1 wherein the magnetic recording channel, the linear feedback shift register and the Viterbi detector comprise circuitry.

11. A magnetic recording channel having an off-track interference emulator, the off-track interference emulator comprising:

an analog-to-digital converter (ADC);

a linear feedback shift register;

a multiplier receiving an output from the linear feedback shift register and applying an adjusting factor, the multiplier then sending an interference signal;

an adder, receiving a digitized output from the ADC and adding the interference signal from the multiplier to produce a test signal; and a Viterbi detector, wherein the linear feedback shift register generates a pseudo-random binary sequence that simulates an error signal, the and the Viterbi detector detects errors in the test signal and determines an error rate.

12. The off-track interference emulator of claim 11, further comprising a finite impulse response filter, in communication with the analog-to-digital converter and an interpolated timing recovery system linked to the filter, wherein the interpolated timing recovery system converts an output of the ADC to a time sequence of ternary values, and the adder receives an output of the interpolated timing recovery system.

13. The off-track interference emulator of claim 11, further comprising a data storage and retrieval system having a storage medium and a read/write head.

14. The off-track interference emulator of claim 11, wherein the magnetic recording channel, the linear feedback shift register, the multiplier, the adder, and the Viterbi detector comprise circuitry, and the adjusting factor is programmable.

15. The off-track interference emulator of claim 13, wherein the data storage and retrieval system and the magnetic recording channel are selected from the group consisting of a physical data storage and retrieval system and magnetic recording channel and a computer model of a data storage and retrieval system and magnetic recording channel.

16. The off-track interference emulator of claim 15, wherein the data storage and retrieval system is selected from the group consisting of a hard disk drive and a floppy disk drive.

17. A method of testing for errors in a magnetic recording channel, the method comprising:

providing an analog signal;

digitizing the analog signal via an analog to digital converter to produce a digital output;

providing an error signal from a linear feedback shift register;

adding the error signal to the digital output to produce a second signal;

sending the second signal to a Viterbi detector; and determining an error rate.

18. The method of claim 17, further comprising programmably adjusting the error signal with a multiplier.

19. The method of claim 17, further comprising processing the digital output through a finite impulse response filter and an interpolating timing recovery system, wherein the interpolating timing recovery system converts the digital output to a sequence of ternary numbers.

20. The method of claim 17, wherein the interpolated timing recovery system operates at a speed at least 5% faster than a bit rate of the analog signal.

21. The method of claim 19, wherein the magnetic recording channel, the analog to digital converter, the finite impulse response filter, the interpolated timing recovery system, the linear feedback shift register, the multiplier, and the Viterbi detector comprise circuitry residing on a chip.

22. The method of claim 17, wherein the magnetic recording channel is selected from the group consisting of a physical channel and a computer model of a channel.

23. The method of claim 22, wherein the magnetic recording channel is a portion of a drive selected from the group consisting of a hard disk drive and a floppy disk drive.

* * * * *